Patented Mar. 24, 1942

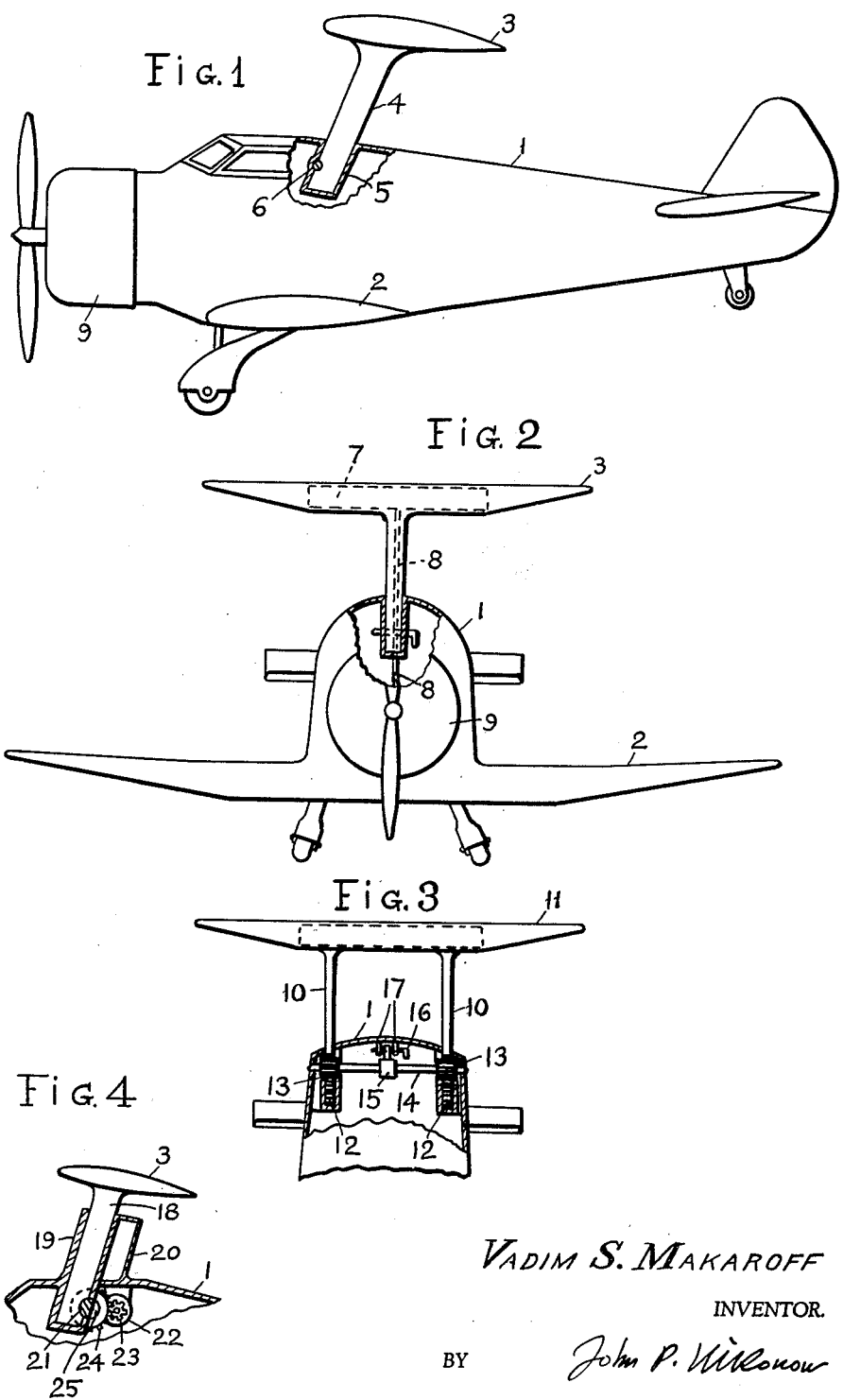

2,277,242

UNITED STATES PATENT OFFICE 2,277,242

AIRPLANE

Vadim S. Makaroff, New York, N. Y.

Application January 26, 1940, Serial No. 315,651

1 Claim. (Cl. 244—43)

My invention relates to airplanes and has particular reference to airplanes having removable wings.

Modern military airplanes, such as bombers and, particularly, pursuit planes, require very high speeds for their effective operation and must therefore be provided with very powerful engines and relatively short wing span with correspondingly high load factor. As a result, they can fly only at high speeds, consuming a large amount of fuel and, since the fuel storage capacity must be necessarily limited, such airplanes have a relatively short radius of action and cannot be used for attacking objects separated from their bases by more or less large expanses of land or sea.

Efforts have been made to remedy this situation by providing such airplanes with supplementary folding or retractable wings to enable them to take off with an increased load at a relatively low speed. The supplementary wings can be then retracted in flight thus reducing air resistance and increasing the speed. It has been found, however, that it is practically impossible to build such a complicated retracting mechanism within the space of high powered airplanes and to make such wings sufficiently strong to withstand tremendous stresses encountered in modern airplanes without greatly increasing their weight and, consequently, reducing the maximum speed.

I have found, however, that a very satisfactory construction can be obtained by providing a high powered airplane with detachable auxiliary wings. Such auxiliary wings are made as a single unit with their supporting struts and are adapted to be placed above the fuselage, the ends of the struts being removably fitted in corresponding holes in the structure of the airplane where they are locked by a suitable device.

The airplane with such auxiliary wings represents a biplane with an ample wing surface and, therefore, with a reduced load factor, and is capable of carrying a considerably increased load including the extra fuel supply, bombs, etc. It can be sent to relatively distant points, flying at a reduced speed made possible by the increased wing surface, with a corresponding economy in fuel consumption. Upon arrival of the airplane at its destination, the pilot, if he desires to place his plane in a combat condition, releases the auxiliary wing, which is then carried away by the air pressure. The airplane, being thus converted into a fast monoplane, will be free to maneuver at its highest speed, still retaining enough fuel for its return trip. On the other hand, if the pilot does not find it necessary to engage the enemy, he may return to his base without shedding the auxiliary wings.

The auxiliary wings, being only of a temporary service, and not required to be used in high speed operations, power dives, etc., may have a relatively light load factor and can be therefore built of light, inexpensive materials so that the cost of such an auxiliary wing will be relatively low.

It is evident that the space in the auxiliary wing may be used for storing an additional supply of fuel for the outward trip, the emptied fuel tank being discarded together with the wing.

My invention is more fully described in the accompanying specification and drawing in which—

Fig. 1 is an elevational view of my airplane partly in section;

Fig. 2 is a front view of the same partly in section;

Fig. 3 is a fractional front view of a modified construction partly in section;

Fig. 4 is a fractional elevational view of another modification.

My airplane comprises a body or fuselage 1 with ordinary permanent wings 2. The wings are so designed that the airplane can be used for high speed operations as is required, for instance, in military airplanes for combat and bombing purposes.

The airplane, when flying at high speeds as a monoplane, has a limited radius of action, consuming large amounts of fuel for its powerful engines and being necessarily limited in its carrying capacity, being therefore unable to carry a substantial load of fuel or bombs for a long distance flight.

In order to enable my airplane to traverse a long distance at a relatively slow cruising speed before it reaches a zone of military operations, I provide my airplane with a supplementary or auxiliary wing or wings 3 placed preferably well above the body as shown in Figs. 1 and 2 and supported on an extension or strut 4. The end of the strut is slidably fitted in a pocket 5 formed in the upper portion of the body 1 and is locked in its position by any suitable device such as a bolt 6 slidably fitted in the strut and passing through the walls of the pocket or socket 5. The auxiliary wing is designed to convert the airplane into a biplane so as to materially increase its load carrying capacity and to reduce the load factor of the wings thereby enabling the airplane to fly at a reduced cruising speed with a corresponding economy in fuel. The auxiliary wing may be provided with a supplementary fuel tank 7 shown in dotted lines in Fig. 2, having a pipe 8 passing through the strut to the engine of the airplane.

At the beginning of flight, the auxiliary wing is fitted and locked in its position by the bolt 6. The fuel pipe 8 is connected to the engine carburetor so that the main supply of the fuel is not used during the outward flight to the zone of operations. Upon arrival at its destination, the airplane is prepared for high speed maneuvering and military operations by disconnecting the pipe 8 from the carburetor and withdrawing the bolt 6. The auxiliary wings are then set free and are rapidly blown upward and away by the air pressure. The pilot may place the airplane in a more favorable position for removing the auxiliary wings by tilting the airplane so as to increase its angle of incidence. The airplane is thereby converted into a fast monoplane and can be used for military operations at its highest speed and maneuverability, having the main fuel supply conserved for the return trip.

Two struts 10 may be used for greater stability of the auxiliary wings 11 as shown in Fig. 3. The struts have rack teeth 12 at their ends engaged by pinions 13 on the ends of a shaft 14 rotatably supported in the body. This arrangement insures a uniform or synchronous withdrawal of both struts so as to obtain their uniform withdrawal without any binding. An arm 15 on the shaft is held locked by a bolt 16 passing through brackets 17 attached to the wall of the body, thereby retaining the struts in their places. The bolt is withdrawn for releasing the struts.

It should be noted that the normal lifting force applied to the wing 3 in flight is amply sufficient to move the wing rapidly upward while the airplane itself drops down somewhat, having lost a portion of its lift upon removal of the auxiliary wing. Therefore, with the mounting of the auxiliary wing above the body, there is no danger of the wing striking the rudders upon its release.

Under certain conditions, however, it may be desirable to increase the upward movement of the auxiliary wing at the time of its release, and such a construction is shown in Fig. 4. The strut 18 of the wing 3 slides in a raised guiding tube or socket 19 enclosed in a streamlined cowling 20. The wing is therefore raised to a considerable height above the body of the airplane at the time of its release. In order to facilitate the release of the wing, a locking rod 21 is provided engaging a corresponding recess in the end portion of the strut 4. The rod can be turned to about 180° by an electric motor 22 or by any other suitable arrangement, through gears 23 and 24. The rod in its released position faces the strut by its flat side 25 thereby releasing the strut.

Such an airplane, when used as a bomber, will materially increase the effectiveness of bombing attacks due to the increased bomb carrying capacity. Smaller airplanes can be made to carry a relatively large load of bombs, for which it would be otherwise necessary to employ much larger machines.

The removable wings can be also applied to commercial airplanes to facilitate their taking off and for increasing their load carrying capacity. The removable wings can be used over and over again by attaching ordinary parachutes to them at the time of their release.

It is understood that my airplane can be further modified without departing from the spirit of my invention as set forth in the appended claim.

I claim as my invention:

An airplane having a body with permanent wings, auxiliary wings, struts extending downward from the auxiliary wings at both sides of the body, the body having sockets for the struts, gear teeth on the struts, pinions in mesh with the gear teeth, a shaft mounting the pinions at its ends, means to rotatively support the shaft in the body, and means to rotate the shaft for simultaneously ejecting both struts from the sockets.

VADIM S. MAKAROFF.